O. MORTENSEN.
MILKING MACHINE.
APPLICATION FILED NOV. 1, 1907.

923,065.

Patented May 25, 1909.
2 SHEETS—SHEET 1.

WITNESSES:

INVENTOR,
OSCAR MORTENSEN,
by van Oldenneel Schoenlank
Attorneys.

O. MORTENSEN.
MILKING MACHINE.
APPLICATION FILED NOV. 1, 1907.

923,065.

Patented May 25, 1909.
2 SHEETS—SHEET 2.

WITNESSES;
W. H. Berrigan.
John N. Hoving.

INVENTOR,
OSCAR MORTENSEN,
by Ku Oldencelo Schoenank
Attorneys.

UNITED STATES PATENT OFFICE.

OSCAR MORTENSEN, OF FREEPORT, COPENHAGEN, DENMARK.

MILKING-MACHINE.

No. 923,065. Specification of Letters Patent. Patented May 25, 1909.

Application filed November 1, 1907. Serial No. 400,206.

*To all whom it may concern:*

Be it known that I, OSCAR MORTENSEN, engineer, (who is a subject of the Kingdom of Denmark,) residing at Freeport, Copenhagen, Denmark, have invented a new and useful Milking-Machine; and I do hereby declare the following to be a full, clear, and exact description of the same.

This invention relates to a milking machine provided with an improved form of milking cup, which surrounds the teat of the animal, which is provided with means for exerting pressure all around the teat at the root, or which exerts pressure simultaneously from two diametrically-opposite sides upon the teat, so that the cup is closed at its top, and the apparatus is also provided with means for producing suction in the milking-cup, causing suction upon the teat; this soon causes the inner elastic wall of the milking-cup to press on the teat, and close around this and press the milk out. Thereupon pressure and suction will then cease, permitting the teat to return to its natural shape, whereafter milking is kept up, by pulsations of the apparatus, causing alternate pressure and suction.

Embodiment of the invention are shown in the accompanying drawings, wherein—

Figure 1:
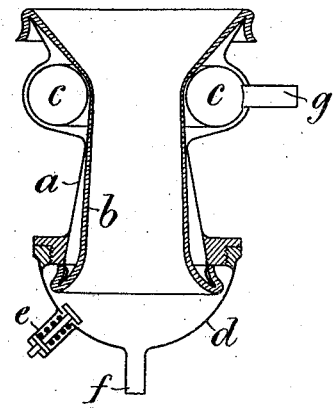
Figure 2:
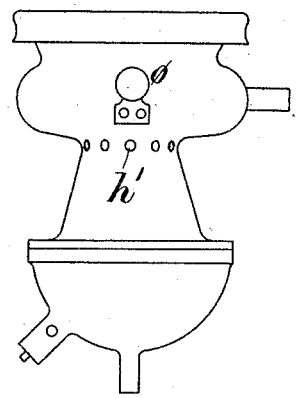
Figure 3:
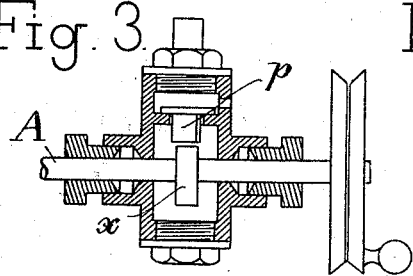
Figure 4:
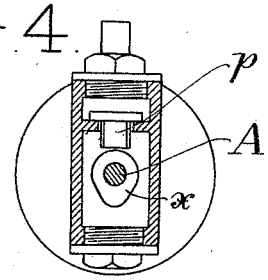
Figure 5:
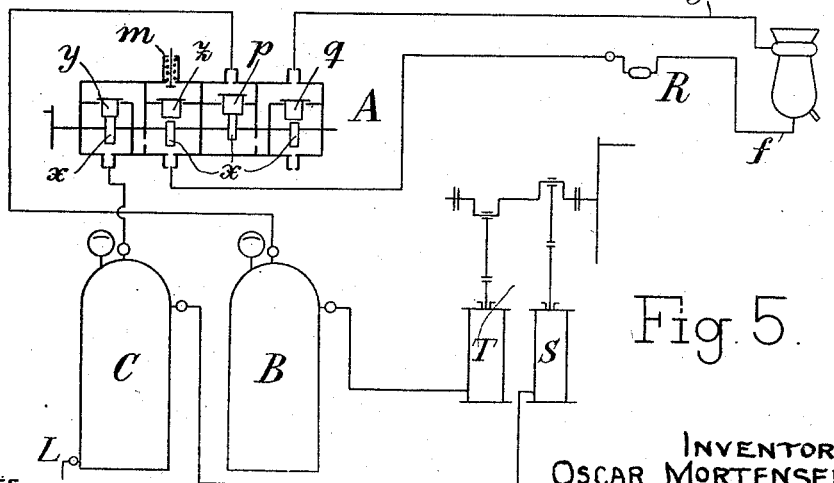
Figure 6:
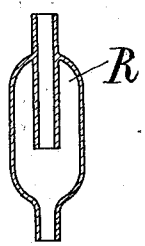
Figure 7:
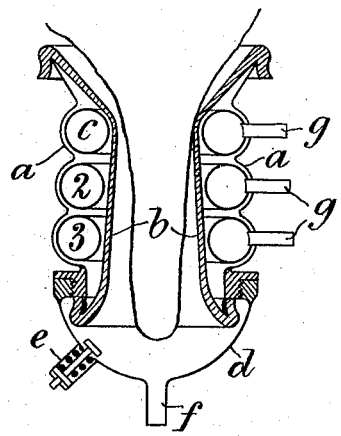
Figure 8:
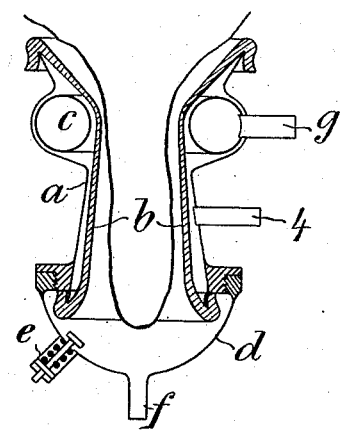

Figures 1 and 2 show a milking-cup in vertical section and in elevation; Figs. 3 and 4 show, respectively, a pulsation-valve in longitudinal section and in cross section; Fig. 5 is a diagrammatic view of an entire apparatus embodying the invention, including a sucking- and pressing- pump, a sucking- and pressing- reservoir, pulsation - valves, conducting pipes, observation - glass and milking-cup; Fig. 6 is a vertical section of the observation-glass; Figs. 7 and 8 show vertical sections through two other modified constructions of milking-cups.

The form of milking-cup shown in Figs. 1 and 2, consists of a metal-casing $a$ having therein an elastic wall tubular in form, and secured at its upper and lower edges only to the casing, so as to leave the thinner parts free between said ends; surrounding the elastic wall and between it and the casing, there is a hollow, elastic ring $c$ which is fitted within an annular collar of the casing and is provided with a pressing-pipe $g$. The milking-cup is completed by a metal-cup $d$, which is screwed to the casing and is provided with a breathing valve $e$ and a suction-pipe $f$.

In the construction as per Figs. 7 and 8, the ring $c$ is replaced by two oppositely-disposed plates $h$, each placed on its piston-rod, the spring-pressed pistons $k$ of which move in cylinders, to which is conducted pressure-medium through the pressing-pipes $g$.

There are holes $h'$ in the metal-wall, so that the air is readily admitted to and expelled from the space between the firm and the elastic wall of the milking-cup.

The milking-cup is moreover provided with eyes, (one of which is shown at $\phi$, Fig. 2) by means of which a strap, over the back of the animal prevents the cup from falling.

The pulsation is assured by four pulsation-valves $p$, $q$, $z$ and $y$; $q$ opens for admission of atmospheric air, $p$ for the pressing-medium, $z$ for atmospheric air and $y$ for suction-air. The pressing-pump is marked T, the suction - pump S, the pressing - air-reservoir B and the suction-reservoir C; said pumps and reservoirs are connected as shown in Fig. 5. Each of the valves is opened by an eccentric disk or cog-disk placed on a shaft A and closed by the pressure upon their upper faces. When the shaft A is rotated, the valves operate in the following way.

The valve $p$ is opened, whereby pressure-medium passes over the valve $q$ through the pipe $g$ to the ring $c$ or the pistons $k$, and the teat is compressed at the root. The valve $y$ is opened, whereby sucking is admitted under the valve $z$ to the pipe $f$; as a result the air is sucked out of the milking-cup, and the atmospheric air entering the openings $h'$ (Fig. 1) will compress the elastic wall $b$ (Fig. 1) around the teat, so that the milk simultaneously is sucked and pressed out. Then the valves $p$ and $y$ are closed, and the valve $q$ is opened, so that atmospheric air passes through the pipe $g$ to the ring $c$ or the piston $k$. At the same time also the valve $z$ is opened, but here the air passes first through the slightly spring - charged valve $m$, so that in the milking-cup is steadily maintained a weak suction, just sufficient to keep the milking-cup slightly attached to the udder. On its way from the milking-cup to the suction-reservoir (where the milk is accumulated and tapped through the cock L), the milk passes through the observation-glass R.

When the udder is empty this can be seen, because the glass R is also empty. It can be observed at the glass if the milk is running sufficiently fast, by pressing on the small spring-charged valve $e$ and thereby admitting a little air. This valve can be adjusted in such way that it admits air at a certain degree of suction, giving security against too strong suction.

The construction of Fig. 7 shows, in addition to the pressing-ring $c$, two other pressing-rings 2 and 3 placed below each other. In the manner heretofore described, the pressure-medium is first pressed into the ring $c$, so that the teat is compressed at the root by the elastic wall $b$, and then the rings 2 and 3 are inflated, one after the other. Then suction is, as before, produced through the pipe $f$, then the pressure and suction cease, and the operation begins again.

The construction of Fig. 8 is like that of Fig. 1, and the casing $a$ is provided with a pipe 4, through which (after inflation of the ring $c$ in the usual way) pressure-medium is supplied, so that the elastic wall will compress the teat after it has been closed above.

In the last-named constructions suction may be dispensed with, as the milking can take place solely by the successive pressing operations; in this case, the suction funnel $d$, the breathing-valve $e$ and the pipe $f$ are quite superfluous.

What I claim is:

1. In a milking machine, a milking cup comprising an outer casing and an inner elastic circular casing movable independently of the outer casing, and ring within the cup for surrounding a teat near its root and for pressing thereon, in combination with connections for inflating and deflating said ring, and with connections for causing the elastic casing of the cup to press around the teat below and independently of the ring aforesaid.

2. In a milking machine, a milking cup comprising an outer casing and an inner elastic casing movable independently of the outer casing, and a hollow ring located between the two casings and surrounding the inner one, and adapted to surround a teat near its root and to press thereon, in combination with connections for inflating and deflating the ring, and with connections for causing the elastic casing of the cup to press around the teat below and independently of the ring aforesaid.

3. In a milking machine, a milking cup comprising an outer casing and an inner tubular casing of elastic material connected at its top and bottom edges with the outer casing, and ring within the cup for surrounding a teat near its base and for pressing thereon, in combination with connections for inflating and deflating the ring, and with connections for causing the unconnected parts of the elastic inner casing to press around the teat below and independently of the ring aforesaid.

4. In a milking machine, a milking cup having an open top and provided with a fluid discharge opening from its bottom, an inner tubular casing of elastic material connected at its top and bottom edges with the outer casing and leaving a passage therethrough connecting with said discharge opening, a hollow ring surrounding the inner casing and located between it and the outer casing, in combination with connections for inflating and deflating the ring, and with connections for causing the unconnected parts of the elastic inner casing to press around the teat below and independently of the ring aforesaid.

5. A milking cup having an open top and provided with a fluid discharge opening from the bottom, and an inner tubular casing of elastic material connected at its top and bottom edges with the outer casing and leaving a passage therethrough connecting with said discharge opening, and a hollow inflatable ring surrounding the inner casing embracing the neck of the teat and located between it and the outer casing.

6. A milking cup having an open top, a tubular casing of elastic material having an opening from end to end adapted to surround a teat, and connected with and having movement relatively to the cup, and an inflatable ring within the cup and also adapted to surround a teat near the neck of the same.

7. A milking cup adapted to surround a teat and having an outer casing and an inner elastic casing, adapted to move relatively to the outer casing, means within the cup and adapted to press around the teat at its root, and a valve and spring controlling the same for supplying atmospheric air to the interior of the cup.

8. A milking cup adapted to surround a teat and having an outer casing and an inner elastic casing having movement relatively to the outer casing, an inflatable ring within the cup, surrounding the inner casing and adapted to compress the latter, and means for compressing the inner casing independently of said ring.

9. A milking cup adapted to surround a teat and having an outer casing and an inner elastic casing having movement relatively to the outer casing, and a succession of independently-inflatable rings within the cup, each surrounding and adapted to independently compress the inner casing.

10. The combination in a separate unitary structure forming a milking cup, of an external casing, an elastic inner casing fastened top and bottom to the external casing and capable of movement independently of the outer casing, both said casings entirely encircling the teat, means for creating suction and pressure on the teat, and an adjustable automatic device opening into the inner casing, adapted to control the pressure on the teat, substantially as set forth.

In testimony whereof, I have signed my name to this specification in the presence of two subscribing witnesses.

OSCAR MORTENSEN.

Witnesses:
L. STUB,
F. PETERSEN.